Aug. 8, 1939.  T. M. RAGAN  2,168,961

AUTOMOBILE STEERING WHEEL

Filed March 27, 1939  2 Sheets-Sheet 1

Thomas M. Ragan
INVENTOR

BY Philip A. H. Terrell
ATTORNEY

Aug. 8, 1939.  T. M. RAGAN  2,168,961
AUTOMOBILE STEERING WHEEL
Filed March 27, 1939  2 Sheets-Sheet 2

Thomas M. Ragan
INVENTOR

BY Philip A. H. Powell
ATTORNEY

Patented Aug. 8, 1939

2,168,961

UNITED STATES PATENT OFFICE 2,168,961

AUTOMOBILE STEERING WHEEL

Thomas M. Ragan, Tulsa, Okla.

Application March 27, 1939, Serial No. 264,500

6 Claims. (Cl. 74—557)

The invention relates to steering wheels of the type used in connection with motor driven vehicles, and has for its object to provide a rotatable hand grip member to one side of the axis of the wheel, and adapted to be gripped by the operator, particularly during a short turn operation for facilitating the wheel rotation, and at the same time allowing a straight pull on the rotatable member.

A further object is to dispose the rotatable grip member within the lines of the wheel so the rotatable member will not interfere with the arms of the operator during a steering operation.

A further object is to dispose the rotatable member in antifrictional bearings of an annular member forming one of the spokes of the wheel and connecting the hub to the rim.

A further object is to form the rotatable member with a hand grip at one side of the opening therethrough and conforming to the shape of the inner sides of the fingers and the palm of the hand.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
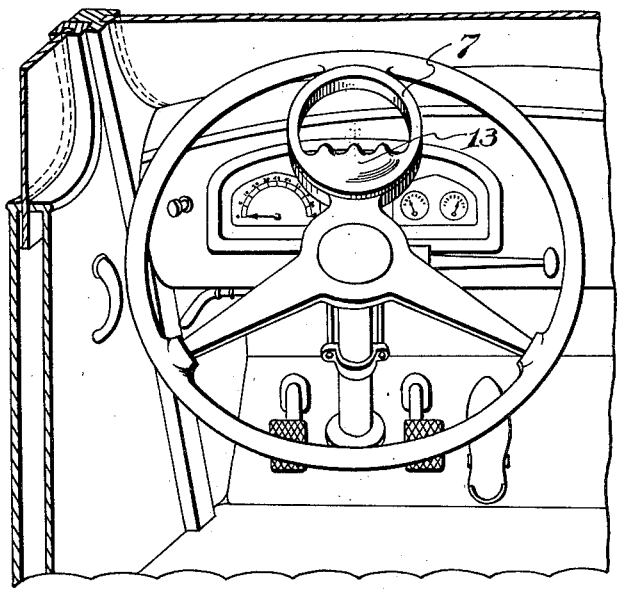
Figure 1 is a perspective view of the wheel.
Figure 2:
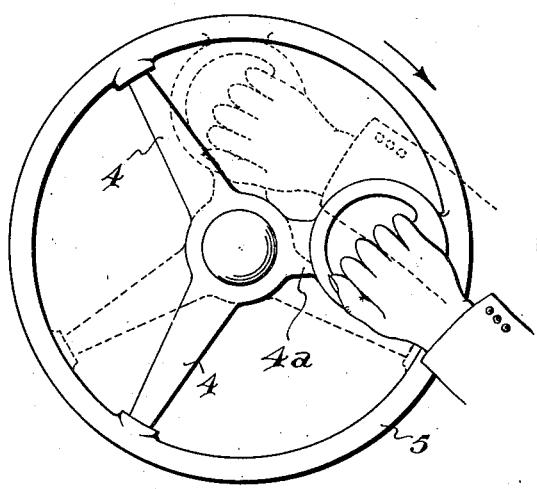
Figure 2 is a top plan view of the wheel, showing the positions the device assumes when the wheel is turned to the right.
Figure 3:
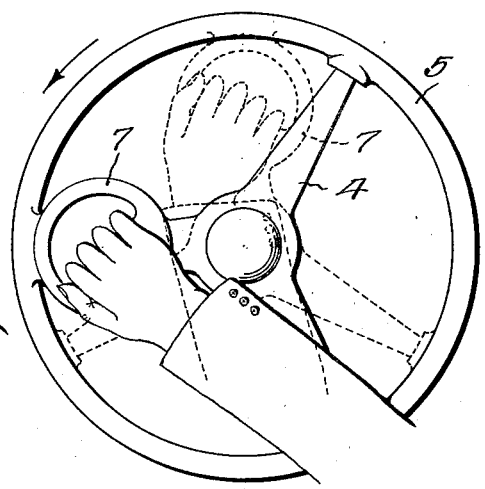
Figure 3 is a view similar to Figure 2 showing the position the device assumes when the wheel is turned to the left.
Figure 4:
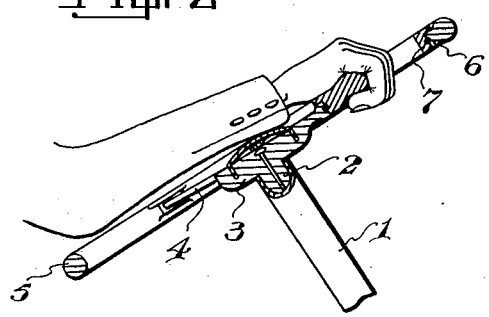
Figure 4 is a vertical longitudinal sectional view through the wheel.

Referring to the drawings, the numeral 1 designates a conventional form of steering column and 2 a steering shaft extending therefrom. The upper end of the steering shaft is provided with a steering wheel hub 3 having radial spokes 4, the outer ends of which are connected to the wheel rim 5. One of the spokes 4a is provided with an annular bearing ring 6, and in which bearing ring is rotatably mounted the gripping device 7. The bearing ring and rotatable gripping member are provided with raceways 8 in which ball bearings 9 are disposed. The upper side of the rotatable gripping member 7 is provided with an annular flange 10 overlying the annular member 6, and is also provided with a threaded aperture 11 having a plug 12 therein, therefore it will be seen that the antifrictional bearings 9 may be placed in position.

Figure 5:
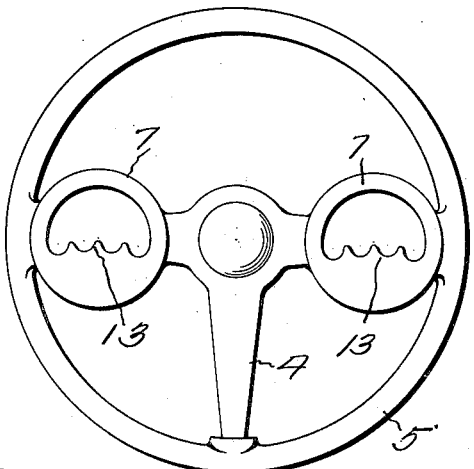
Figure 5 is a modified form of the device showing the same applied to opposite sides of the wheel.
Figure 6:
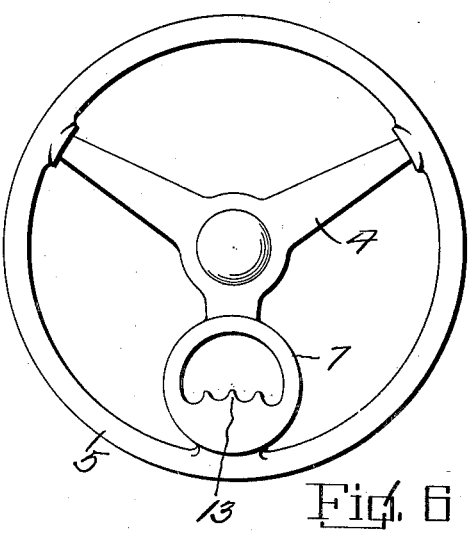
Figure 6 is a plan view of a wheel showing the gripping member applied adjacent the rear side of the wheel.

Referring to Figures 1 to 4 inclusive, the rotatable gripping member 7 is carried by the forward spoke 4a, while in Figures 5 and 6 they are differently positioned, however the same numerals apply thereto. The member 7 has an opening therethrough, and at one side thereof is a hand gripping portion 13, adapted to be gripped by the hand of the operator when making a right or left turn, or any short turn, thereby facilitating the rotation of the steering wheel. As the operator pulls on the device it will assume a normal position so there is a straight line pull at all times. It will be noted that the wheel inclines, hence the hand grip 13 adds weight at the side of the rotatable member 7, and as the rotatable member 7 is antifrictionally supported the gripping member will always be in a down position for ready use when needed.

Referring to Figure 5, two gripping devices are shown at each side of the axis of the wheel, however the operation is the same as shown in Figures 1 to 4 inclusive.

In Figure 6 the gripping member is on the lower inner side of the wheel opposite that shown in Figure 1.

Figure 7:
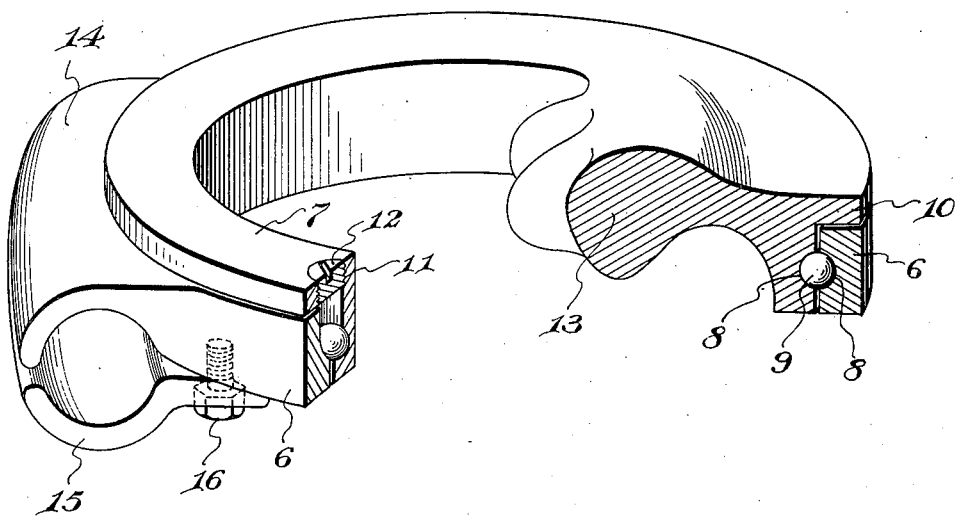
Figure 7 is a detail perspective view, partly in section showing the device provided with a rim clamp for attachment to wheels now in use.

A gripping device is shown in Figure 7, which is adapted to be clamped on the rim 5 of the wheel, and to be applied to steering wheels now in use. In this form the bearing rim 6 is provided with an integral clamping jaw 14, adapted to engage over the upper side of the rim and a clamping jaw 15 adapted to engage the under side of the rim and to be held in clamping engagement therewith by means of bolts 16.

From the above it will be seen that a steering wheel attachment is provided whereby the wheel may be easily and quickly turned, and the operator can impart a direct pull on the wheel at either side thereof. It will also be seen that the gripping members will be in down position at all times incident to the weight thereof and the inclination of the wheel, where they may be easily gripped.

The invention having been set forth what is claimed as new and useful is:

1. The combination with a steering wheel, of a rotatable grip to one side thereof, said grip having an opening therethrough and a counterweighted gripping side carried by the rotatable grip.

2. A device as set forth in claim 1 wherein said rotatable grip is antifrictionally supported within a bearing ring forming one of the spokes of the wheel.

3. The combination with a steering wheel disposed on an incline, of a gravity actuated rotatable grip carried by said wheel, said rotatable grip having a counterweighting gripping portion at the lower side thereof.

4. A device as set forth in claim 3 wherein the rotatable gripping member is within the plane of the wheel.

5. A device as set forth in claim 3 including a bearing ring forming the spoke of the wheel and in which ring the rotatable grip is mounted.

6. A device as set forth in claim 3 including rotatable grips carried by the wheel spokes on opposite sides of the axis of the wheel.

THOMAS M. RAGAN.